No. 634,069. Patented Oct. 3, 1899.
J. D. PRESCOTT.
VEHICLE TIRE.
Application filed Jan. 3, 1899.

(No Model.)

Witnesses
Robert Everett

Inventor:
Joseph D. Prescott.
By James L. Norris
Atty.

UNITED STATES PATENT OFFICE.

JOSEPH D. PRESCOTT, OF BOSTON, MASSACHUSETTS, ASSIGNOR OF TWO-THIRDS TO ALBERT W. GRIFFITH, OF SAME PLACE, AND CHARLES N. BACON, OF WINCHESTER, MASSACHUSETTS.

VEHICLE-TIRE.

SPECIFICATION forming part of Letters Patent No. 634,069, dated October 3, 1899.

Application filed January 3, 1899. Serial No. 701,012. (No model.)

*To all whom it may concern:*

Be it known that I, JOSEPH D. PRESCOTT, a citizen of the United States, residing at Boston, in the county of Suffolk and State of Massachusetts, have invented new and useful Improvements in Vehicle-Tires, of which the following is a specification.

The invention is designed for the production of a vehicle-tire which is an improvement upon the well-known pneumatic tire in that it is more durable and is susceptible of a wider range of use and upon the ordinary cushion-tire in that it possesses all the advantages of said cushion-tire and overcomes some of the disadvantages thereof in the matter of resiliency, cost of construction, and ability to stand wear.

The object of the invention is to produce a resilient tire having an inner homogeneous core of yielding material and an outer covering for the core, in which a close, permanent, and waterproof connection is made between said core and covering.

Other objects and advantages of the invention will hereinafter appear, and what is considered as new and patentable will be set forth in the claim.

Figure 1:
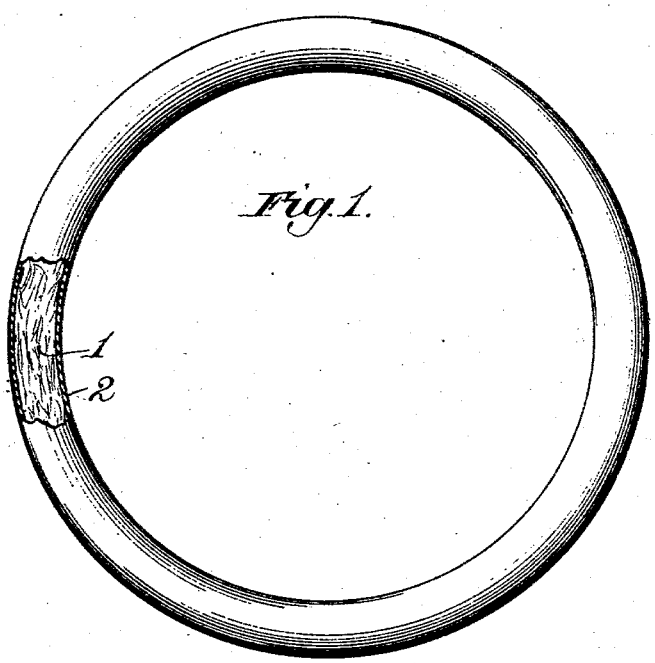
Figure 2:
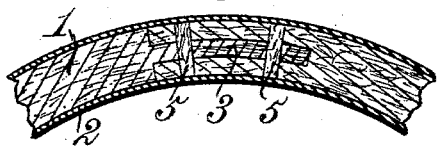
Figure 4:
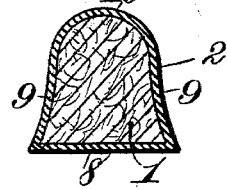
Figure 3:
Figure 5:
Figure 6:

In the drawings, Figure 1 represents a side elevation of a tire constructed according to this invention, the outer covering being partly broken away. Fig. 2 is a similar view of the core, showing the means of connecting the ends thereof. Fig. 3 is a view illustrative of the ends of the core before they are connected. Fig. 4 is a cross-section of the tire as employed upon buggies and other like vehicles. Figs. 5 and 6 represent similar sections of the wheel-rim in which said tire fits, showing the same before and after the application of the tire thereto.

The improved tire is made up of an inner core 1, of homogeneous yielding material, and an outer case or covering 2, of rubber, the latter being vulcanized upon the core, completely inclosing the same and forming a water-tight housing therefor. For bicycles and other like vehicles the core 1 and the covering 2 are circular in cross-section, and the tire is applied to the rim of the wheel in the usual manner.

The core 1 is preferably made of a continuous strip of felt having a tongue 3 upon one end and a socket 4 in the opposite end for receiving said tongue, this construction being for the purpose of making a smooth and tight joint at the meeting ends of the core, the connection being completed by felt locking-pins 5, passing through the overlapping portions. If desired, however, the pins 5 may be made integral with the tongue 3. The core, with its ends joined in the manner indicated, has the covering 2, of rubber, vulcanized around it, and the completed tire consists of a practically integral inner resilient core and outer case. The core is completely protected, and the connection between it and the covering is a permanent one.

With buggies and the like when an outer metallic rim 6 is secured to the wheel, provided with side flanges 7 7, forming a channel, the tire is made, as shown in Fig. 4, with an inner surface 8, which is flat in cross-section, and with sides 9, which converge toward the outer rounded tread-surface 10. The flanges 7 7 are originally formed at right angles to the body of the rim 6 to permit of the ready insertion of the tire between them, but are afterward bent inwardly, as shown in Fig. 6, to grip or clamp against the sides 9 of the tire and prevent the latter from slipping off or being readily removed. Instead of this method of applying the tire, however, the flanges may be inturned originally except at one point and the tire inserted either bodily or in sections through the open space which is left beneath the flanges and forced longitudinally into proper position.

Having now described the invention, what is claimed as new is—

A vehicle-tire comprising a core made in a single piece from felt, one end of said core having a tongue formed thereon provided with lateral openings, and the other having a socket therein in which said tongue fits and lateral openings intersecting said socket and adapted to register with the openings in said tongue, felt pins extending through both sets of openings, and a covering vulcanized upon said core, as and for the purpose set forth.

In testimony whereof I have hereunto set my hand in presence of two subscribing witnesses.

JOSEPH D. PRESCOTT.

Witnesses:
CHARLES E. ROGERS,
WILLIAM S. W. CAIE.